Nov. 16, 1943.  J. H. OWENS  2,334,351
MOTION PICTURE THEATER
Filed Oct. 9, 1942
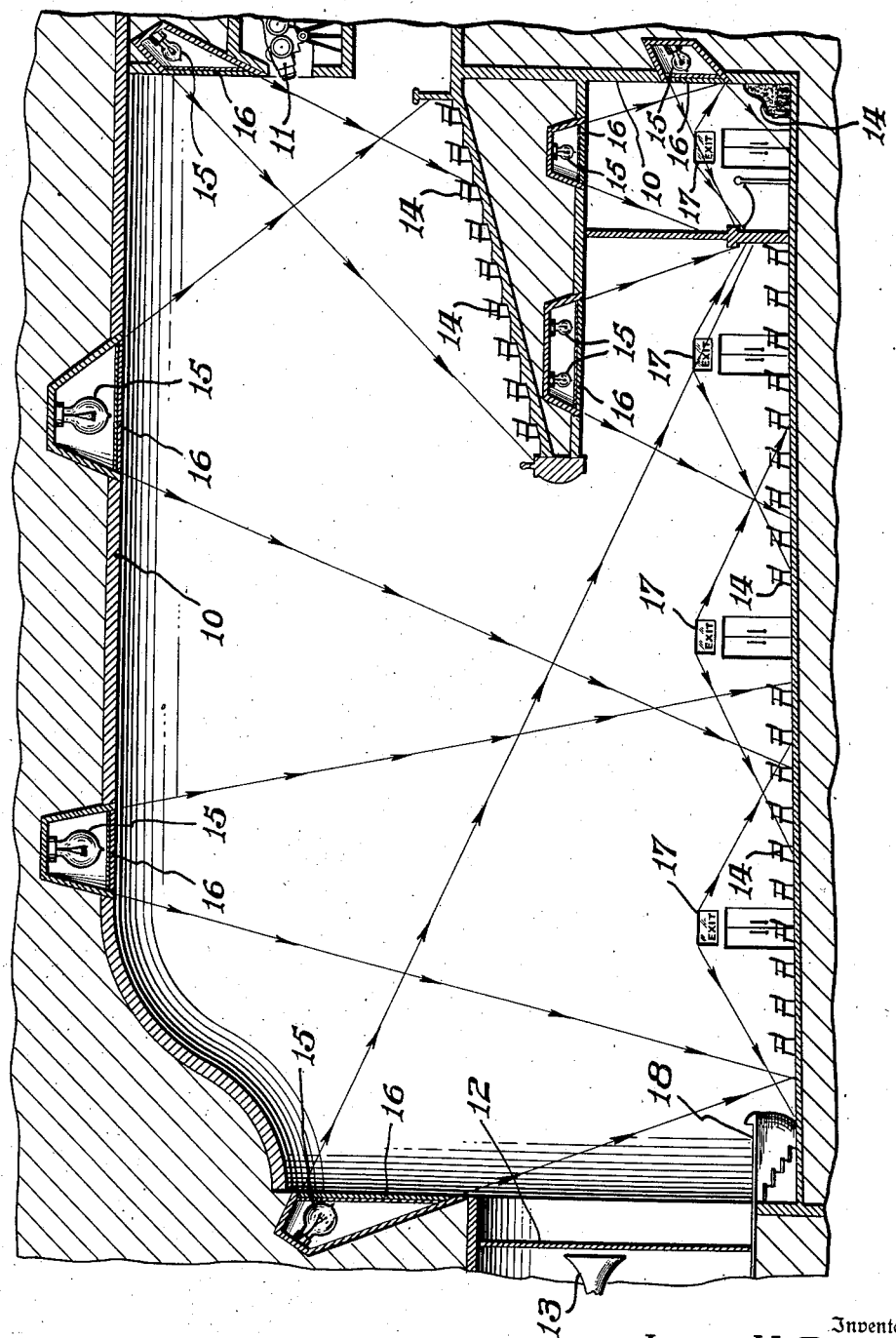
Inventor
JAMES H. OWENS
By
C.D. Tuska
Attorney Patented Nov. 16, 1943

2,334,351

UNITED STATES PATENT OFFICE 2,334,351

MOTION PICTURE THEATER

James H. Owens, Camden, N. J., assignor to Radio Corporation of America, a corporation of Delaware Application October 9, 1942, Serial No. 461,391

3 Claims. (Cl. 240—3)

This invention relates to a motion picture theater and more particularly to a motion picture theater provided with a type of illumination which permits the patrons to comfortably find their way around and at the same time does not interfere with the visibility of the picture.

It has heretofore been proposed to use carpets with fluorescent patterns and to provide small light sources adjacent the aisles which cause fluorescence of the pattern so that the patrons could see the aisle, and occasionally fluorescent markings have been used. In all such instances, however, relatively small light sources have been provided which were only sufficient to illuminate a small area of the fluorescent materials.

In my improved motion picture theater, I provide large ultra violet light sources so that the entire theater is flooded with ultra violet light, thereby permitting the use of fluorescent patterns in the carpets and on the seats, thus making vacant seats readily apparent and permitting the movement of patrons around the theater as if it were illuminated, while at the same time there is not sufficient light to interfere with the the visibility of the picture.

In addition, the ultra violet light intensity is sufficiently high so as to provide a certain amount of therapeutic effect. The level of illumination must be sufficiently low so that the exposure of the patrons thereto for the entire period of the performance will not be harmful but at the same time the level of illumination should be sufficiently high so that a slight effect is produced.

One object of the invention is to provide an improved system of illumination in a motion picture theater.

Another object of the invention is to provide a general flooding of a motion picture theater with ultra violet light so that fluorescent materials or markers anywhere within the theater will be excited.

Another object of the invention is to provide a motion picture theater with sufficient general ultra violet illumination to produce a slight therapeutic or "suntan" effect on the patrons.

Other and incidental objects of the invention will be apparent to those skilled in the art from a reading of the following specification and an inspection of the accompanying drawing in which:

The single figure of drawing is a schematic longitudinal section through a motion picture theater constructed in accordance with my invention.

Referring now to the drawing, the theater is provided with the usual ceiling and walls indicated at 10. The usual projection booth is provided at the rear of the theater as indicated at 11, with the projection screen 12 at the front of the theater and the appropriate sound reproducer 13 concealed behind the screen in the usual manner. A stage may be provided at 18, if desired. The theater is, of course, provided with the usual seats 14 which may be upholstered with fabric having a fluorescent pattern or which may have portions such as the upper back painted with fluorescent paint so that vacant seats can be readily located.

The general ultra violet illumination is provided by appropriate ultra violet lights such as those indicated at 15 distributed about the auditorium, preferably in recesses as illustrated. An appropriate type of light source for the purpose is, for example, the Westinghouse type RS sun lamps. These lamps have sufficient light available at the wave length of 2967 Angstrom units to produce an effective therapeutic effect and at the same time provide sufficient illumination at the wave length of 3650 Angstrom units to activate the fluorescent materials. These lights, in addition to the ultra violet light, provide considerable intensity of visible light which is filtered out by appropriate filters 16. Appropriate glass filters having high transmission in the ultra violet and substantially opaque to visible light are available commercially. One type of such filter is, for example, the ultra violet transmitting filter glass manufactured by the Corning Glass Works at Corning, New York. An ultra violet type of filter is described by R. W. Wood in his book entitled "Physical Optics," which describes the use of a thin layer of silver on a glass support for transmitting ultra violet and preventing the transmission of visible light.

At places where visible light is desired as, for example, at the exit light at 17, similar light sources may be used with corresponding filters and the lighting may be provided by appropriate fluorescent materials. Alternatively, at the exit light a red glass filter may be used for the light, permitting a sufficient quantity of the visible light from the ultra violet sources to be transmitted to render the signs and the exit doors visible.

The light intensity must be chosen with due regard to the area to be covered and the other dimensions of the theater. The light should not be sufficiently intense to produce any damage to a patron with a delicate skin during the entire period of a performance. On the other hand, it is desirable that the light intensity should be sufficiently high so that an appreciable tan will be produced and maintained if the patron attends the performances regularly.

The invention is also of particular value at sea side resorts or in the vicinity of bathing beaches, as the patrons may attend the theater in costumes which expose considerable portions of their skins to the ultra violet rays and may thereby enjoy the advantages of the sunlight while at the same time enjoying the motion picture.

Having now described my invention, I claim:

1. In a motion picture auditorium provided with seats fluorescent under ultra violet light to indicate when they are unoccupied, sources of ultra violet light flooding the auditorium with ultra violet light and filters preventing the spreading of sufficient visible light from said sources to interfere with the viewing of the motion picture.

2. In a motion picture auditorium provided with seats fluorescent under ultra violet light to indicate when they are unoccupied, sources of ultra violet light flooding the auditorium with ultra violet light of mild therapeutic effect and filters preventing the spreading of sufficient visible light from said sources to interfere with the viewing of the motion picture.

3. In a motion picture auditorium provided with seats fluorescent under ultra violet light to indicate when they are unoccupied, sources of ultra violet light flooding the auditorium with ultra violet light of sufficient intensity to produce a mild therapeutic effect during the normal time of a program but of insufficient intensity to produce any injurious effect during the same period and filters preventing the spreading of sufficient visible light from said sources to interfere with the viewing of the motion pictures.

JAMES H. OWENS.